United States Patent
Hodzic et al.

(10) Patent No.: US 8,018,995 B2
(45) Date of Patent: Sep. 13, 2011

(54) SYSTEM AND METHOD FOR TRICK PLAY OF HIGHLY COMPRESSED VIDEO DATA

(75) Inventors: Edin Hodzic, Pleasanton, CA (US); Andrew M. Goodman, Portola Valley, CA (US)

(73) Assignee: Vudu, Inc., Santa Clara, CA (US)

( * ) Notice: Subject to any disclaimer, the term of this patent is extended or adjusted under 35 U.S.C. 154(b) by 1542 days.

(21) Appl. No.: 11/388,613

(22) Filed: Mar. 23, 2006

(65) Prior Publication Data

US 2006/0218607 A1    Sep. 28, 2006

Related U.S. Application Data

(63) Continuation-in-part of application No. 11/331,113, filed on Jan. 10, 2006, now abandoned, and a continuation-in-part of application No. 11/075,573, filed on Mar. 9, 2005.

(51) Int. Cl.
 *H04N 7/26* (2006.01)

(52) U.S. Cl. ............... 375/240.01; 375/240.05
(58) Field of Classification Search ............ 379/201.04; 386/343; 375/240.01, 240.05–240.09
See application file for complete search history.

(56) References Cited

U.S. PATENT DOCUMENTS

| 6,445,738 B1* | 9/2002 | Zdepski et al. ......... 375/240.01 |
| 2005/0094724 A1* | 5/2005 | Lee ..................... 375/240.01 |
| 2009/0288124 A1* | 11/2009 | Aaby et al. ................ 725/93 |

* cited by examiner

*Primary Examiner* — Rasha Al Aubaidi
(74) *Attorney, Agent, or Firm* — Mahamedi Paradice Kreisman LLP

(57) ABSTRACT

A system for providing trickplay functionality—such as pause, instant replay, rewind, fast forward, etc—for very highly compressed video/audio data stream. Depending on the trickplay functionality, the system configures the duration of playback before a jump, the decoding speed required, the number of pictures to display per second, and the distance between jumps. The system may comprise a decoder, a picture rate controller and a display.

20 Claims, 14 Drawing Sheets

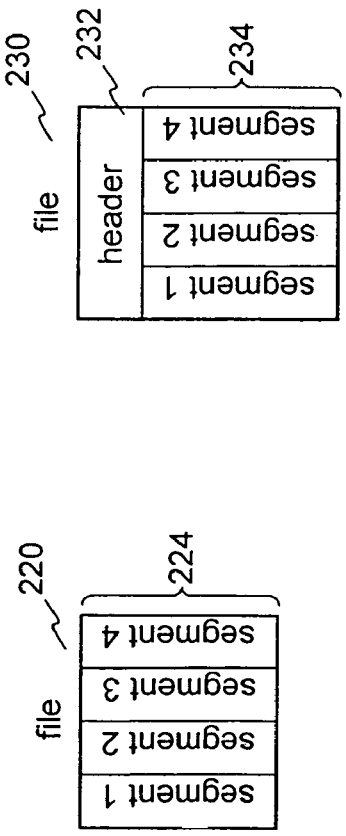
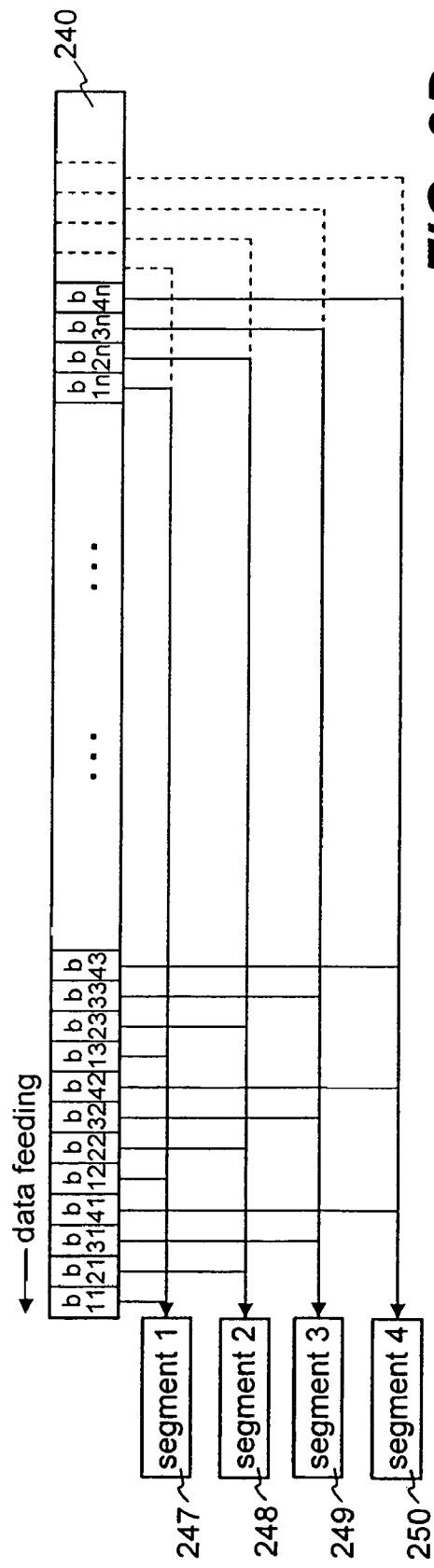

FIG. 3C (350)

|  | Self | 306-n | 306-3 | 306-1 |
|---|---|---|---|---|
| seg1 | IPA1 |  |  |  |
| seg2 |  | IPA2 |  |  |
| seg3 |  |  | IPA3 |  |
| seg4 |  |  |  | IPA4 |

FIG. 3B (330)

|  | IP Address | Time-fill (1~5000) | title1 | title2 | ... | title 5000 |
|---|---|---|---|---|---|---|
| Box 1 | address 1 | Program1 | seg1 seg3 | seg4 | ... | seg4 |
| Box 2 | address 2 | Program2 | seg3 seg4 | seg1 | ... |  |
| Box 3 | address 3 | Program3 | seg2 seg3 | seg4 | ... |  |
| Box N | address n | Program4 | seg1 seg3 | seg3 | ... | seg1 |

Local machine (330), 332, 334, 336, 338, 340, 342

FIG. 3D (352)

|  | box1 | back up | box2 | back up | box3 | back up | box4 | back up |
|---|---|---|---|---|---|---|---|---|
| seg1 | IPA1 | IPA |  |  |  |  |  |  |
| seg2 |  |  | IPA2 | IPA |  |  |  |  |
| seg3 |  |  |  |  | IPA3 | IPA |  |  |
| seg4 |  |  |  |  |  |  | IPA4 | IPA |

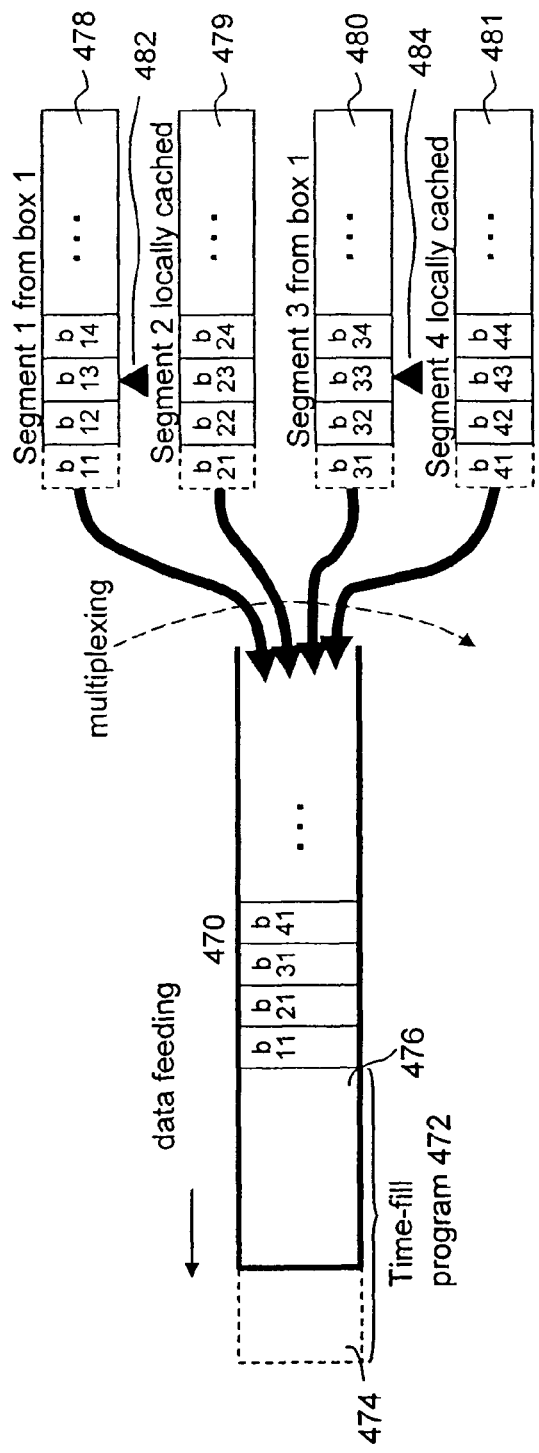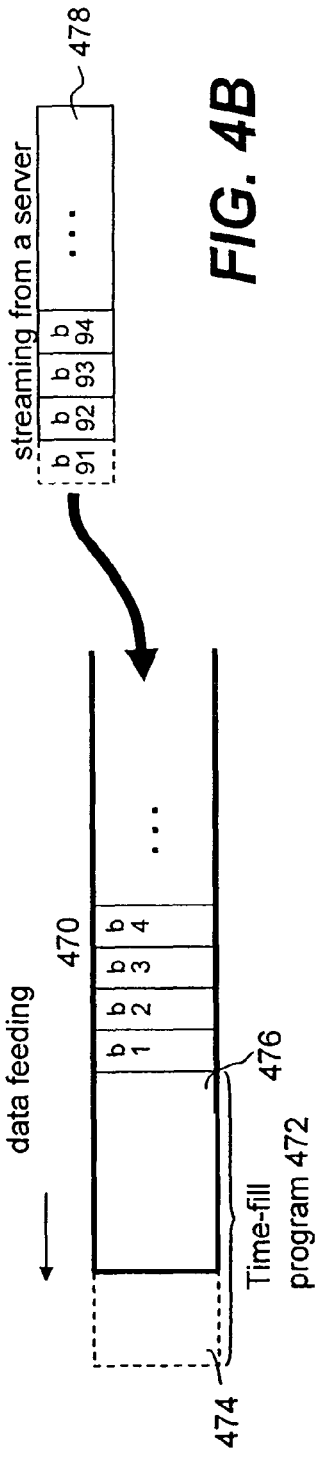
FIG. 4A
FIG. 4B

A GROUP OF PICTURES IN A MPEG2 VIDEO

A POSSIBLE GROUP OF PICTURES IN AN AVC VIDEO

SYSTEM AND METHOD FOR TRICK PLAY OF HIGHLY COMPRESSED VIDEO DATA

CROSS-REFERENCE TO RELATED APPLICATION

This is a continuation-in-part of co-pending U.S. application Ser. No. 11/331,113, entitled "Access Control of Media Services Over an Open Network" and filed Jan. 10, 2006, and by at least one of the co-inventors herein, and is also a continuation-in-part of co-pending U.S. application Ser. No. 11/075,573, entitled "Continuous data feeding in a distributed environment" and filed Mar. 9, 2005, and by at least one of the co-inventors herein, which patent applications are incorporated herein by reference in their entirety for all purposes.

BACKGROUND

1. Technical Field

The present invention is generally related to multimedia delivery over the Internet. Particularly, the present invention is related to techniques providing access control of media services offered on an open network, such as the Internet, the Satellite based on a hybrid architecture taking the benefits, features and advantages of both client-server architecture and distributed architecture.

2. Description of the Related Art

Continuous or on-demand media data such as video and audio programs have been broadcasted over data networks (e.g., the Internet). Broadcast of such media information over data networks by digital broadcasting systems provides many advantages and benefits that cannot be matched by current television cable systems or over-the-air broadcasting.

With the media-over-network systems, service providers are often able to draw viewers into an exciting, interactive and enhanced television or viewing experience. Video-On-Demand (VOD) or Near Video-On-Demand (NVOD) collectively referred to herein as VOD programs are examples of the interactive television programs typically provided by a service provider to its subscribers. VOD programs are video sessions that subscribers can order whenever they want or per NVOD schedules. FIG. 1 shows a video delivery system 100 that is commonly used for delivering VOD programs over a network. The video delivery system 100 includes a video server 102 that is sometimes referred to as a head-end. Through a data network 104, the video server 102 can provide continuous, scheduled and video-on-demand (VOD) services to respective client machines 106-1, 106-2, . . . 106-n (i.e., its subscribers). The server 102 is further coupled to a media storage device 112 that may be configured to store various media files (e.g., movies or news footage). The media storage device 112 must be online, store and supply titles scheduled or demanded for delivery to any of the client machines 106-1, 106-2, . . . 106-n.

To ensure quality of service (QoS), the bandwidth requirement of the network path (e.g., 108-1, 108-2, . . . 108-n) to each of the client machines 106-1, 106-2, . . . 106-n has to be sufficient. However, as the number of the subscribers continues to increase, the demand on the bandwidth of the backbone network path 110 increases linearly, and the overall cost of the system 100 increases considerably at the same time. If the server has a fixed bandwidth limit and system support capability, an increase in the number of subscribers beyond a certain threshold will result in slower transfer of data to clients. In other words, the transmission of the video data over the network 104 to the subscribers via the client machines 106-1, 106-2, . . . 106-n is no longer guaranteed. When the video data is not received in a client machine on time, the display of the video data may fail or at least become jittery.

To alleviate such loading problem to the video server 102, a video delivery system often employs multiple video servers as rendering farms, perhaps in multiple locations. Each of the video servers, similar to the video server 102, is configured to support a limited number of subscribers. Whenever the number of subscribers goes beyond the capacity of a video server or the bandwidth thereof, an additional video server needs to be deployed or additional bandwidth needs to be allocated. Subsequently, overall costs go up considerably when more subscribers sign up with the video delivery system 100.

Although more servers may be added to accommodate more subscribers, the implementation of the video server 102 present many challenges to consider in access control. Among the challenges, one of them is that only a single subscriber or household is permitted to view a particular VOD program that was ordered, yet the transmission of its video data over an open network may reach hundreds or thousands of homes. Another challenge is that a service provider has no knowledge exactly how many times a particular VOD program has been accessed once the particular VOD program is released to a subscriber. Still another challenge requires that a service provider has sufficient equipment to deal with encryption and decryption processes, often in real time, and generally the equipment is expensive.

There have been various efforts towards improving access control by addressing some of the above-mentioned challenges. One conventional approach uses a conditional access (CA) system that uses session-based security schemes to assure that only specific subscribers who have purchased viewing rights to a VOD transmission can view the content and that other subscribers within the transmission area are unable to view the content.

FIG. 1B is a block diagram representing the video server 102 of FIG. 1A. The video server or conventional media delivery center 130 represents one example of the sophisticated and costly equipment conventionally required to provide decryption and encryption processing for secure access. The media delivery center 130 may receive a Digital Video Broadcast (DVB) that is transmitted to the media delivery center 130 by a source provider. A DVB is directed to a decryption unit 132. The decryption unit 132 operates to convert the DVB which is encrypted into a decrypted DVB. The decrypted DVB is then directed to an IP gateway 134 that operates to convert the decrypted DVB into separate content streams representing individual programs. The individual programs are formatted in an IP format when output from the IP gateway 134. The separate content streams may be immediately delivered or be stored to a media storage device 136 until an appropriate time for their broadcasting to various subscribers over a data network.

Various content streams include IP packets that are directed to appropriate channels for delivery over the data network. The IP packets include IP data representing the content of the programs. Prior to transmission over the data network, the IP packets are encrypted by an appropriate encryption unit 138. The media delivery center 130 may include a plurality of encryption units 138, with each encryption unit 138 being associated with a separate channel supported by the media delivery center 130. Hence, as noted above, the decryption and subsequent encryption performed, often real time, at the media delivery center 130 require sophisticated and costly hardware which is out of reach for many smaller scale service providers.

One idea behind the conditional access system as depicted in FIG. 1B is that only an authorized set-top box associated with a subscriber can decrypt a video stream from the media delivery center 130 for playback. A typical way to enforce such a mechanism is to have a tamper-proof smart card on every set-top box. Each smart card has a unique secret key embedded in it. A media service delivery center (e.g., head-end) broadcasts special messages (called EMMs—entitlement management messages) that can only be decrypted or understood by a particular smart card. Such EMMs are used to provide a particular smart card with the "master key" to decrypt specific programs (e.g., VOD titles or PPV movies). The master key may be updated periodically with updated EMMs. Once the smart card has the "master key" for a program, it can help decrypt the video stream for an ordered program.

Exactly how and when the "master key" is fed to the smart card can vary quite a lot. For example, for a pay-per-view service, a user may make a phone call to order a PPV event/movie, at which time or shortly after, an EMM message with the master key is fed to the smart card associated with the user through the broadcast mechanism. In another example, such as impulse pay-per-view, a smart card is already given the "master keys" to the content even before the user orders it. The user may order the event on the box, at which time the smart card logs the "purchase" in its secure memory and lets the use watch the content.

In addition to the increasing costs in deploying more servers to accommodate more subscribers, the conditional access system as described above is subject to many issues. Among the issues, one of them is that the conditional access system could not prevent "cloning attacks" by which multiple set-top boxes use the same cloned smart card to receive the media services. Another issue is the repeated access to an order program that is already in a set-top box.

Thus, there is a need for improved techniques for cost effective ways for service providers to securely deliver programs to subscribers over an open network.

SUMMARY

This section is for the purpose of summarizing some aspects of embodiments of the present invention and to briefly introduce some preferred embodiments. Simplifications or omissions in this section as well as the title and the abstract of this disclosure may be made to avoid obscuring the purpose of the section, the title and the abstract. Such simplifications or omissions are not intended to limit the scope of the present invention.

Broadly speaking, the invention relate to techniques for providing media services over an open network. To ensure that media services are only provided to those authorized users or receiving devices, the present invention provides conditional access techniques to secure media contents being delivered over an open network. In a prior art conditional access system, an entitlement control message generator is used to generate entitlement management messages or entitlement control messages entitlement management messages containing a control word (or an encryption key) and an entitlement identification. The entitlement control messages are broadcasted and received by all receivers. If the entitlement identification in the entitlement control message matches the entitlement of an ordered receiver, the entitlement control messages are decrypted. The control word is then supplied to a descrambler in the receiver.

In contrast, the server in the present invention does not need to broadcast messages containing a control word. Instead, the server needs only to communicate with an ordering box when the ordering box is requested for ordering a program (e.g., a movie or event). Depending on implementation, a master key may be delivered in many ways. For example, an entitlement control message containing a master key can be sent directly to the ordering box. Alternatively, a secure session may be established between the server and the ordering box, such that all secured information including a master key may be transported. Further different from the prior art systems, no keys need to be permanently stored in an ordering box or a portable device (e.g., a smartcard) according to one embodiment of the present invention. A key needed to decrypt an entitlement control message may be transported from time to time in a secure session established between the server and the ordering box.

It should be understood that each technique so described herein has its own distinctive features, and all techniques in combination yield an equally independently novel combination as well, even if combined in their broadest sense; i.e. with less than the specific manner in which each of the techniques has been reduced to practice.

In addition to the unique control access in providing media service over an open network, according to one aspect of the present invention, data pertaining to a title is divided or organized into several segments that are distributed among boxes in service. General orders of titles being offered in a library are fulfilled by a group of selected client devices (e.g., boxes) delivering respective segments to an ordering box. Special orders of certain programs (e.g., a live event or a rare title not included in the library) are fulfilled directly by a server. In addition, the server is configured to supply some of the segments to an ordering box or back up any one of the selected boxes designated to supply the needed data to an ordering box. Because of its inherent superior computing power and more bandwidth, the server may deliver more than one segment at a time. The architecture contemplated in the present invention offers the flexibilities of being relatively independent from the number of users while, at the same time, offering centralized management or services to the users. The present invention inherently distributes load among client devices in service by using the computing power and bandwidth collectively available at any time in the client devices. Furthermore, much of the traditional server functionality now get distributed among the client devices in service.

Embodiments of the invention may be implemented in numerous ways, including a method, system, device, or a computer readable medium. Several embodiments of the invention are discussed below. In one embodiment, the invention provides a method of providing media services over a network, the method comprises: receiving a request from one of a plurality of boxes (hereinafter "ordering box"), the request including an order of a title, and communicating with the ordering box directly to determine whether the ordering box has been hacked. If the ordering box has not been hacked, the method further comprises: ensuring that the ordering box has a master key; and identifying one or more of the boxes other than the ordering box to provide distributed segments pertaining to the title to the ordering box, wherein the ordering box proceeds with downloading the distributed segments, and a playback of the title based on the distributed segments together with residing segments, if any, is started or continued, wherein the master key is used to decrypt the distributed segments and the residing segments. If the ordering box has been hacked, the method further comprises: logging an identifier of the ordering box into a database; and revoking any services to the ordering box till the ordering box is updated.

According to another embodiment, the invention provides a system for providing media services, the system comprises a server coupled to a network and configured to manage the medial services, and a plurality of boxes coupled to the network, wherein one of the boxes (hereinafter "ordering box") initiating a request including an order of a title communicates directly with the server configured to proceed with determining whether the ordering box has been hacked. If the ordering box has not been hacked, the server is configured to ensure that the ordering box has a master key; and identifying one or more of the boxes other than the ordering box to provide distributed segments pertaining to the title to the ordering box, wherein the ordering box proceeds with downloading the distributed segments, and a playback of the title based on the distributed segments together with residing segments, if any, is started or continued, wherein the master key is used to decrypt the distributed segments and the residing segments. If the ordering box has been hacked, the server logs an identifier of the ordering box into a database; and at the same time revokes any services to the ordering box till the ordering box is updated. One of the objects, features, and advantages of the present invention is to provide various techniques related to conditional access systems based on a distributed architecture, a client-server architecture, and a hybrid architecture taking the benefits, features and advantages of both distributed architecture and client-server architecture.

According to another embodiment, the invention provides a system for providing trick play functionality—such as pause, instant replay, rewind, fast forward; etc—for highly compressed video/audio data stream. The data compression standards include Advanced Video Coding ("AVC"), also known as H.264, and MPEG4 Part 10. Depending on the trick functionality, the system configures the duration of playback before a jump, the decoding speed required, the number of pictures to display per second, and the distance between jumps. The system may comprise a decoder, a picture rate controller and a display. The decoder may include a decoding chip for decoding compressed video pictures two to four times faster than real-time. The picture rate controller determines which and how many pictures to display.

Other objects, features, and advantages of the present invention will become apparent upon examining the following detailed description of an embodiment thereof, taken in conjunction with the attached drawings.

BRIEF DESCRIPTION OF THE DRAWINGS

The invention will be readily understood by the following detailed description in conjunction with the accompanying drawings, wherein like reference numerals designate like structural elements, and in which:

FIG. 2B, according to one embodiment, a file is being organized or fragmented in terms of four segments; It is explicitly for one embodiment, it is not a good idea to blur that one embodiment for confusion or misunderstanding. The text in the specification has necessary clauses for other than four (4) segments, FIG. 2C shows another embodiment in which a file is being organized or fragmented in terms of a header and four segments, where the header is always locally cached;

FIG. 2D shows a data stream representing a file or a majority of a file, the file is being divided into four segments;

FIG. 3B shows an exemplary source information shown as a map illustrating how a library of 5000 movie titles is distributed across N boxes;

FIG. 3C shows a source information map corresponding to FIG. 3B, where three other boxes are designated to supply the needed three segments that are together assembled with the locally cached segment to facilitate the playback of the ordered movie;

FIG. 3D shows exemplary source information with backup boxes in a table 352 that includes a backup identifier (shown as an IP address) for each of the designated boxes;

FIG. 4A shows an embodiment of an ordering box retrieving and assembling segments to support a playback of a selected movie;

FIG. 4B shows an embodiment of an ordering box receiving streaming directly from a server;

DETAILED DESCRIPTION OF THE INVENTION

The present invention is related to techniques of providing access control in media services based on a distributed architecture or a hybrid architecture taking the benefits, features and advantages of both distributed architecture and client-server architecture. Different from a prior art system in which entitlement control messages are broadcasted to client devices, a decryption key(s) is only distributed or validated when an ordering client machine communicates with a server providing the media services. As a result, access from hacked client machines, if any, can be controlled and the hacked client machines may be forced to be updated or restored.

In the following description, numerous specific details are set forth to provide a thorough understanding of the present invention. The present invention may be practiced without these specific details. The description and representation herein are the means used by those experienced or skilled in the art to effectively convey the substance of their work to others skilled in the art. In other instances, well-known methods, procedures, components, and circuitry have not been described in detail since they are already well understood and to avoid unnecessarily obscuring aspects of the present invention.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments mutually exclusive of other embodiments. Further, the order of blocks in process, flowcharts or functional diagrams representing one or more embodiments do not inherently indicate any particular order nor imply limitations in the invention.

Embodiments of the present invention are discussed herein with reference to FIGS. 1A-6. However, those skilled in the art will readily appreciate that the detailed description given herein with respect to these figures is for explanatory purposes only as the invention extends beyond these limited embodiments.

Figure 2A:
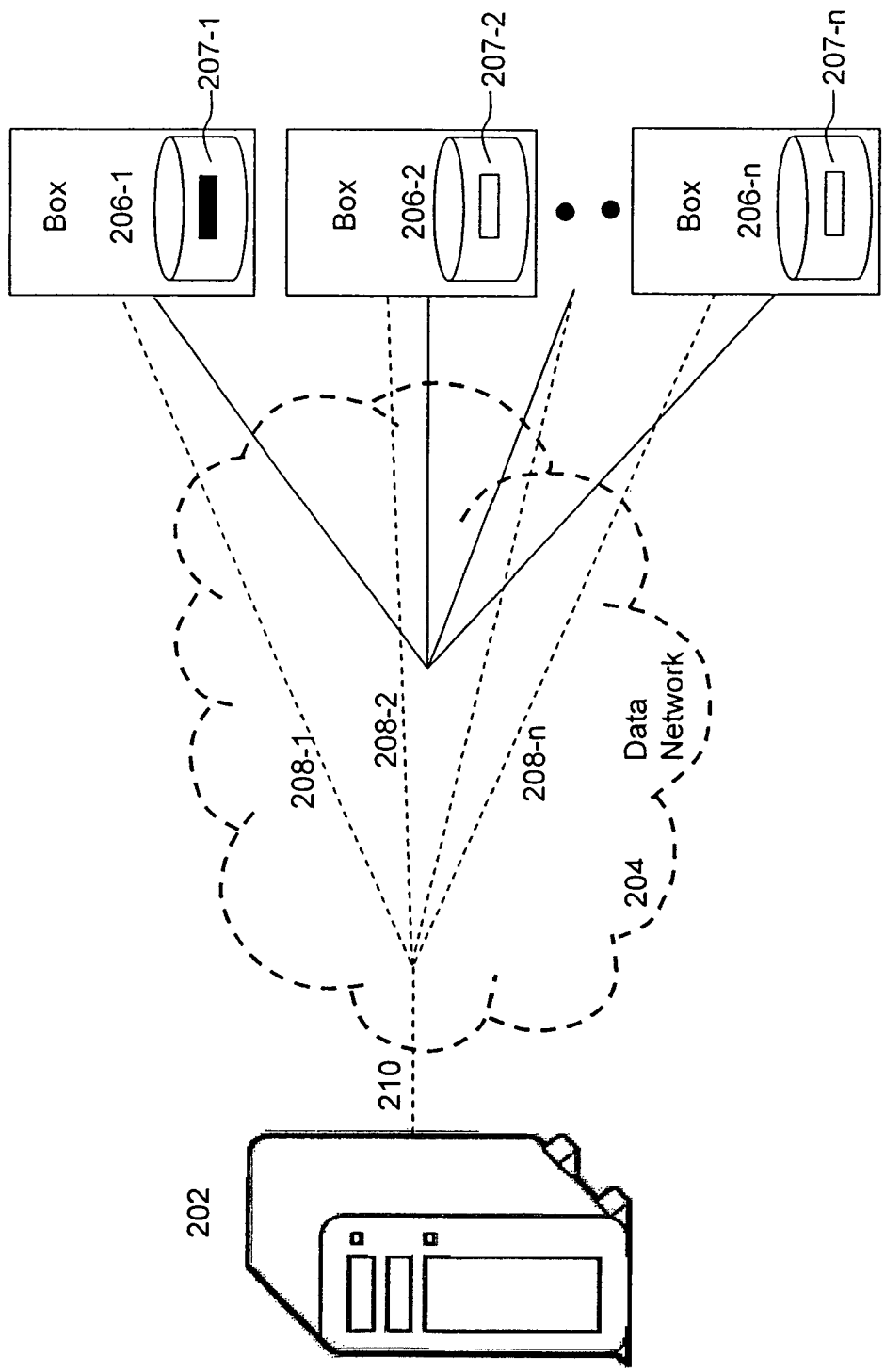
FIG. 2A shows a configuration of a distributed network system in accordance with an embodiment of the present invention.

Shown as FIG. 2A of U.S. patent application Ser. No. 11/075,573, FIG. 2A herein shows an exemplary configuration 200 of a distributed network system 100. A server 202, presumably managed and/or populated by a service provider, is configured to handle the delivery of video (or multimedia) services to users via local machines or boxes 206-1, 206-2, . . . 206-n. Different from the video server 102 of FIG. 1A that delivers video data to a subscriber upon receiving a request therefrom, the server 202 is not responsible for delivering the content in response to a request from a user, and instead is configured to provide source information as to where and how to retrieve at least some of the content from other boxes. In other words, the server 102 of FIG. 1A requires the media storage device 112 to provide the content when any of the client machines 106-1, 106-2, . . . 106-n is being serviced, while the server 202 does not need necessarily a media storage device to provide the content. Instead, some of the boxes 206-1, 206-2, . . . 206-n are respectively configured to supply part or all of the content to each other.

According to one embodiment, when fulfilling a request from a local machine or a box (e.g., 206-1), communication between the server 202 and the box 206-1 over the network paths 208-1 and 210 may be limited to small-scale requests and responses (e.g., of small size and very short). A server response to a request from a box may include source information (e.g., identifiers), authorization information and security information. Using the response from the server 202, the box may be activated to begin playback of a title (e.g., 207-1). Substantially at the same time, the box may initiate one or more requests to other boxes (e.g., 206-2 and 206-n) in accordance with the source identifiers to request subsequent portions of the title (e.g., 207-2 and 207-n). Assuming proper authorization, the requesting box receives the subsequent portions of the data concurrently from the other boxes. Because of box-to-box communication of content, the bandwidth requirement for box-to-server communications over the network paths 208-1 and 210 is kept low and typically short in duration. In the event there are a large number of user boxes issuing playback requests substantially at the same time, the bandwidth of the backbone path 210 should be sufficient to avoid noticeable or burdensome delay.

The contents available in a library being offered in any of the boxes 206-1, 206-2, . . . 206-n are originally provided by one or more content providers. Examples of the content providers include service satellite receivers, television relay stations, analog or digital broadcasting station, movie studios and Internet sites. Depending on implementation, the contents may be initially received or originated in the server 202. Instead of maintaining and managing the content in a large storage device, the server 202 is configured to distribute the content or files to a plurality of local machines registered with the server 202. The boxes 206-1, 206-2, . . . 206-n shown in FIG. 2A are examples of local machines in service. Unless there is a need for a backup copy, the server 202 at any time has no need to keep a copy of the content. On the other hand, unless there is a special need to keep a complete copy of an extremely high-demand title in a box, none of the boxes in service has a complete copy of a title until an order is placed. Consequently, with embedded security in the distributed objects, some embodiments of the present invention may alleviate the concern of electronic piracy and widespread distribution (e.g., by hacking or illegal duplication).

For convenience, it is assumed herein that a file pertaining to a title is played back when the title is selected and ordered by a user. When an order for a title is placed, a corresponding file must be available for playback. One of the features in the system 200 is that a file, or at least a portion thereof, regardless of its size, can be accessed instantaneously, thereby realizing instantaneous VOD. According to one embodiment, where a file is 840 Mbytes on average and a box includes a storage capacity of 300 Gbytes, a system may offer a large library of titles (e.g., 5000) for access at any time instantly. In the prior art, if the files for the titles must be stored in advance to offer instantaneous playback, the local storage of a box would have to have a capacity of 4,000 Gbytes, consequently, rendering instantaneous VOD economically impractical.

According to one aspect of the present invention, only a beginning portion (referred to as a "header") and possibly one or more tail segments of a file are locally cached in a box. Such locally cached segments are referred to as residing objects or segments, while segments not residing locally are referred to as distributed objects or segments. When a title is selected, the header of the corresponding file is instantly played back. During the time the header is being played, the distributed objects corresponding to the title are retrieved simultaneously from other boxes. When the header is finished, the received parts of the distributed segments being streamed in from other boxes is combined with residing segments for the title, if any, to enable a continuous playback. Depending on the popularity and concurrent demand for a particular title, the number of residing objects may be increased or decreased to control the dependency of each box on other boxes for playback. Typically, the more residing objects for a title a box has, the more distributed copies of the title there are in the entire system and thus the less dependency of the ordering box on the other boxes.

In one embodiment, the header is always played first to ensure an instant playback. In another embodiment, the header size is reduced to zero, in which case, a time-fill program is played first to provide a time frame that is sufficient enough to fetch and assembly the beginning data portion of the segments either locally available or from other boxes. Depending on implementation, the time-fill program may include one or more trailers related to the title being ordered, various notifications/updates or commercial programs. The time-fill program may be locally configured. In one embodiment, the time-fill program is provided to give a time frame in which data being fetched from one or more other devices can be stabilized. In another embodiment, the time-fill program provides a platform for sponsors that hope to display their respective programs to audience. Orders or slot positions for these programs in a time-fill program may be auctioned.

Referring to FIG. 2B, there shows an embodiment in which a file 220 is being organized or fragmented in terms of four segments 224. In general, the file 220 representing a collection of all data pertaining to a title may be divided into any number of segments in consideration of a required transmission rate (e.g., related to the encoding and decoding rates for successful playback), and the minimum uploading and downloading capabilities of a network, or even dynamically and adaptively selected depending on the selected serving boxes at run-time and in real-time during the transmission. FIG. 2C shows another embodiment in which a file 230 is being organized or fragmented in terms of a header 232 and four segments 224, where the header 232 is always locally cached. One of the advantages of having a header locally cached is to facilitate an instantaneous playback after a movie is ordered. While the header is being played back, the needed segments are retrieved from other designated boxes. It can be appreciated the length of a header may be predefined or dynamically determined to provide a time buffer (e.g., 5 minutes) sufficiently to retrieve part of the data from the distributed segments for assembling with that of any locally cached segments, if any. As a result, an instantaneous VOD system may be realized.

Regardless whether a header is used or not, a file or a majority of a file will be fragmented and the segments are distributed among the boxes in service. According to one embodiment, given a required transmission rate (e.g., 1 megabit per second or 1 Mbps), the minimum uploading and downloading speeds of a network are considered to determine a number that defines the segmentation, and thus the dependency on other boxes and the support for concurrent demands of a particular title.

It is assumed that a minimum uploading speed is U and a required transmission rate is D, and D/U=K<k, where k is the smallest integer greater than K. In one embodiment, a file or a majority of a file is preferably divided into k segments to optimally utilize the uploading speed of U, assuming that the downloading speed is at least k times faster than the uploading speed. For example, in a POTS-based DSL network for residential areas, the required transmission may be about 1.0 Mbps while the uploading speed may be about 300 kbps. Hence, k=4. Assuming that an ordering box has a downloading speed four times the uploading speed of the other boxes, up to four segments in other boxes can be downloaded concurrently across the network as streaming into the ordering box without interruption. "Adaptively or dynamically segmenting" have been already covered, making K adaptively or dynamically changed would just make the above specific example invalid or non-operative.

FIG. 2D shows a data stream 240 representing a file or a majority of a file. The file 240 is divided into four segments 247-250. The segments 247-250 are created or formed by respectively sampling the file in a decimated manner. As a result, each of the segments includes a plurality of data blocks. Depending on an exact data length of the file 240, an n-th data block in each of the segments 247-250 is four successive data blocks in the file. In one embodiment, a data block comprises a chunk of data, for example, 256 Kbytes or 1 Mbyte.

As shown in FIG. 2D, the data stream 240 is expressed in data blocks as follows: b11, b21, b31, b41, b12, b22, b32, b42, b13, b23, b33, b43, . . . b1n, b2n, b3n, b4n. With the decimated sampling, the four segments 247-250 obtained can be respectively expressed as follows:

Segment 1={b11, b12, b13, b14 . . . };
Segment 2={b21, b22, b23, b24 . . . };
Segment 3={b31, b32, b33, b34 . . . }; and
Segment 4={b41, b42, b43, b44 . . . }.

It should be noted, however, a header, if used, includes data blocks that must be consecutive so that an instantaneous playback of the header is possible. It is evident that the data blocks in the segments are non-consecutive, interlaced or interleaved.

Figure 1A:
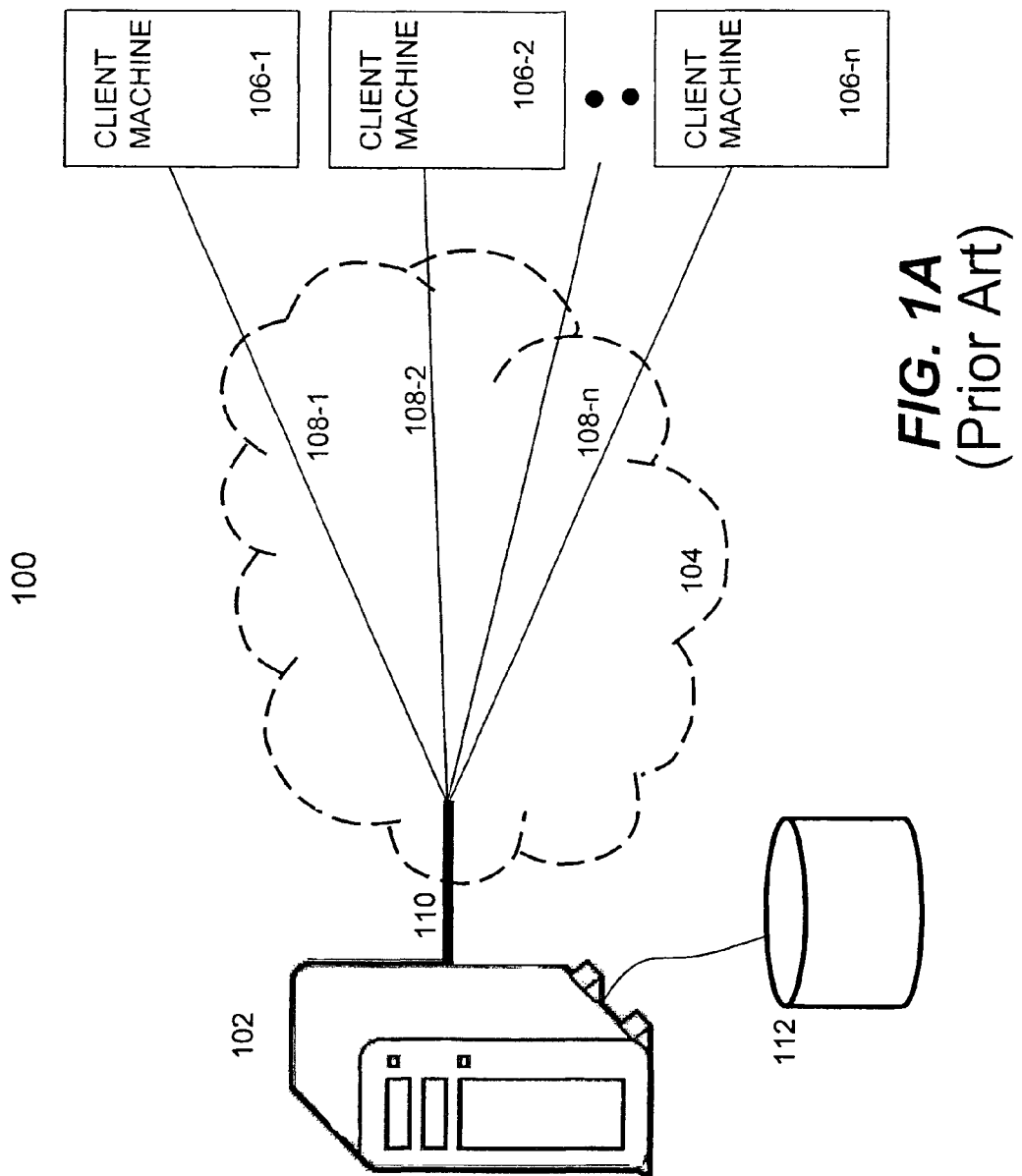
FIG. 1A shows a video delivery system that is commonly used for delivering video services over a network, also referred to as a server-and-client architecture.
Figure 1B:
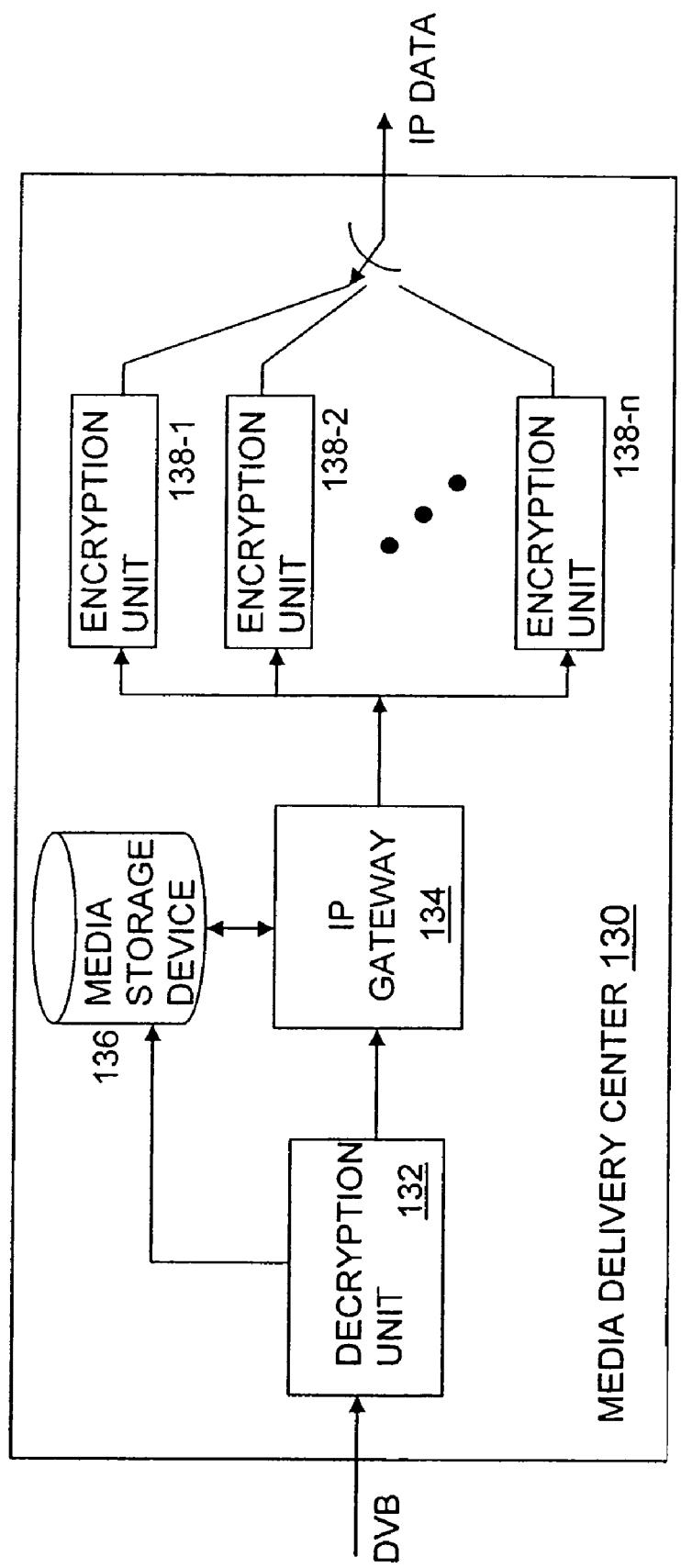
FIG. 1B is a block diagram of a conventional media delivery center employing access control.
Figure 3A:
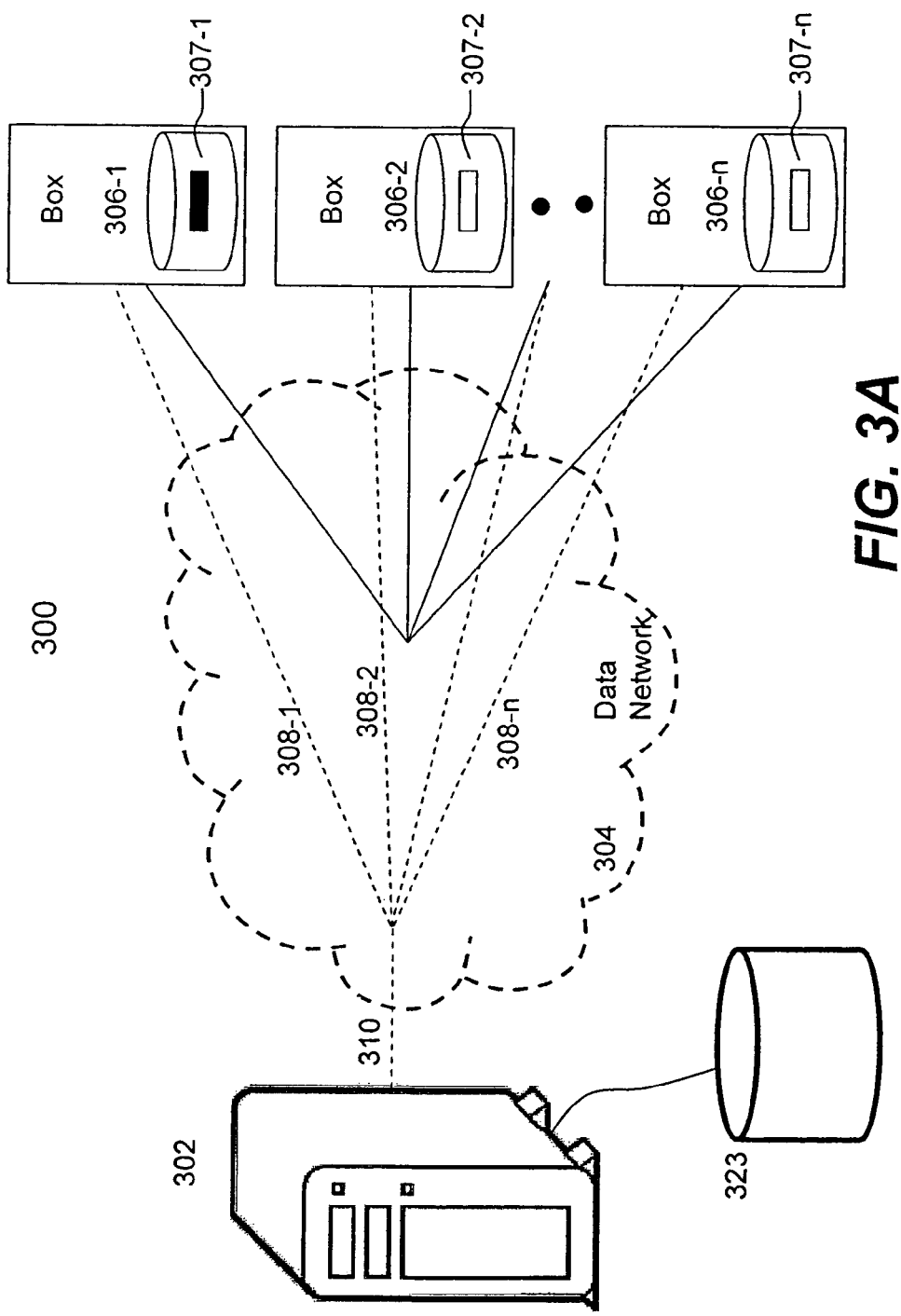
FIG. 3A shows an exemplary architecture that combines both the traditional client and server architecture of FIG. 1 and the distributed architecture of FIG. 2A.

Referring now to FIG. 3A, it shows, according to one embodiment of the present invention, an architecture 300 that combines both the traditional client-server architecture of FIG. 1 and the distributed architecture of FIG. 2A. One of the features, benefits and advantages of the architecture 300 is the underlying mechanism of using the computing capacity as well as the bandwidth in the client side to deliver media services while, at the same time, providing centralized services.

For example, the architecture 300 may be configured to deliver non-prerecorded programs such as live broadcasts by a multicasting protocol. The server 302 receives orders from some of the subscribers (e.g., for boxes 306-1 and 306-n) for a broadcasting event. When the event comes, the server 302 receives a streaming fed from a source (e.g., a televised site). The streaming is then delivered by the server 302 via the network path 310 to 308-1 and 308-n to the ordering boxes 306-1 and 306-n. As the subscriber for the box 306-2 did not order the event, the box 306-2 will not receive the streaming from the server 302. It can be appreciated that the number of recipients for the program does not affect the performance of the server 302 or demands higher bandwidth because the program is being multicast to the ordering boxes.

The architecture 300, at the same, allows non-interrupted media services among the boxes. Similar to the description for FIG. 2A, segments for each title in a library are distributed among the boxes in service. When the box 306-1 is used to order one of the titles in a library, the request is sent to the server 302 via the network path 308-1 and 210. The server 302 is configured to determine which other boxes are most appropriate to be the suppliers for providing the distributed segments. Either the server 302 causes the suppliers to contact the ordering box 306-1 to receive the needed segments or the ordering box 306-1 initiates communication with the suppliers upon receiving a response form the server 302, where the response includes information about the suppliers. In one embodiment, the information includes designation information (e.g., network addresses) as to who are the suppliers, security information as to how to decrypt the data, and other information to facilitate the playback of the ordered title.

FIG. 3B shows exemplary source information shown as a map 330 illustrating how a library of 5000 movie titles is distributed across N boxes. Column 332 lists all boxes in service. Each box is assigned a unique identifier for identification. Information in the column 332 may be viewed as the identifiers for the boxes in service. For example, box 1 is assigned a unique identifier of "Box 1" or a sequence of alphanumeric characters. The column 334 lists a corresponding IP address for each of the boxes listed in column 332. The Column 336 lists predetermined time-fill programs for all titles in the library. Depending on implementation, the time-fill programs may be identical or each of the time-fill programs is self-configured in accordance with what has been ordered. The column 338 lists what segments for title1 are residing in each of the boxes, assuming title1 is required to have two segments cached in each box. The column 340 lists what segment for title2 is residing in each of the boxes, assuming title2 is required to have one segment cached in each of the boxes. The column 342 lists what segment for title5000 is in a selected set of boxes, assuming title5000 is required to have one segment in these selected boxes. As a result, all segments in a box may be uniquely addressed for uploading to another box or playback of an ordered title locally.

FIG. 3C shows a source information map 350 corresponding to FIG. 3B. There are three other boxes 306-n, 306-3 and 306-1 designated to supply three needed segments that are together assembled with a locally cached segment to facilitate the playback of the ordered movie. It can be appreciated that relying on multiple sources to retrieve distributed segments to support a playback can be advantageously used in the architecture of current networks where the downloading bandwidth is typically a multiple of the uploading bandwidth.

FIG. 3D shows exemplary source information with backup boxes in a table 352 that includes a backup identifier (shown as an IP address) for each of the designated boxes. Should one of the boxes fail to respond to the request for a segment from the ordering box or the segment cannot be received correctly, the backup IP address is immediately called upon to switch to the corresponding backup box that is available to provide or continue to provide a segment that the originally designated box fails to provide.

Referring now back to FIG. 3A, It can be appreciated that at any time the server 302 may designate itself to be one of the suppliers to an ordering box. In other words, a supplier provided to an ordering box can be either another box in the network or the server itself. According to one embodiment, when the supplier is a server, it is capable of supplying more than one segment. Although it is possible for a designated box to supply more than one segment for a title at a time to an ordering box, it is preferable that a server is configured to do so because the server inherently has more computing power and bandwidth than a single box does. According to one embodiment, the server may provide only a portion of a segment in order to complement a supplier that provides another portion of the segment in case the supplier cannot upload the segment at a sufficiently high rate. According to one embodiment, the server may attempt to designate client boxes as suppliers for a title but may designate itself as a back-up box in case an originally designed client box fails in the process.

In one embodiment, when a server is designed to be one of the suppliers to service an ordering box, the server is not necessarily the one that provides the designation information. A service provider may deploy several servers, each is designated to cover a specific area in accordance with one or more specification (e.g., popularity, geography, demographics, and/or like criteria).

According to one embodiment, the server 302 is configured to provide titles that are not widely distributed among the boxes in service. It is understood that the distributed architecture as described in FIG. 2A can provide a library with a large number of titles in a box with a limited capacity of storage. These titles are presumably popular among the subscribers. However, there may be some less popular title for which the overhead of storing many copies of its segments on different boxes may be too high, or for which the number of copies available in the network may be insufficient to address a temporary spike in demand for that title. In addition, there may be many titles that are newly introduced into the library and that have not yet been seeded into the boxes in the field. The server 302 can be configured to fulfill the need for serving such titles. According to one embodiment, a storage space 323 is provided to store data related to such rare or newly introduced titles that are not included in a library being offered. Streaming pertaining to such titles may be provided to an ordering box, in which case the data is provided by a unicast protocol. According to one embodiment, the server 302 is configured to provide any title in the library during periods of high demand in the system when there are an insufficient number of client boxes to service all the requests for different titles in the system.

Referring now to FIG. 4A, there shows an embodiment of an ordering box retrieving and assembling segments to support a playback of a selected movie. If all segments are streaming at predetermined minimum speeds, then, at 476, portions of the segments locally stored and the portions of the segments being streamed in are multiplexed into a buffer as shown in FIG. 4A. A portion 474 of the time-fill program 472 has been played out of the buffer 470. The remaining portion 476 of the time-fill program 472 is yet to be played. At the same time, the streaming of segments 478 and 480 is being fed into the buffer 470. Segments 478-481 (including the segments locally stored and the segments being streamed in) are multiplexed into the buffer 470. More specifically, a block of data from segment 1, a block of data from segment 2, a block of data from segment 3 and a block of data from segment 4 are multiplexed and successively fed into the buffer 470. As a result, the original order of the data is restored and the remaining portion of the file pertaining to the title is assembled.

To facilitate the continuation of a data stream, each of the pointers 482 and 484 is used to remember where the data block of a segment is being fed or about to be fed to the buffer 470. In the event, the segment being fetched from a box is interrupted and a backup box needs to step in, the ordering box knows exactly where to start fetching the segment from where it was interrupted in accordance with the pointer. Likewise, similar pointers (not shown) may be provided to remember where the data block of the locally cached segment is being fed or about to be fed to the buffer 470. In the event, the ordering box needs to be reset or is suddenly powered off and back on, these pointers can facilitate the continuation of the playback of the ordered movie.

FIG. 4B shows an embodiment of an ordering box receiving streaming directly from a server. Different from the multiplexing operation shown in FIG. 4A, the ordering box is configured to buffer the data of the streaming into the buffer 470 that is provided to minimize any possible instability or interruption of the streaming. In operation, once an order is placed, a time-fill program 472 is instantly played. At the same time, a data sequence from a server is being fetched and put into the buffer 470. As soon as the time-fill program 472 is done, the buffered portion of the data is started. Not shown in FIG. 4B, data pointers may be used in FIG. 4B to facilitate the continuation of the playback of the data in case the ordering box is accidentally out of operation and turned back on.

It should be readily understood to those skilled in the art that the above description may be equally applied to cases in which instantaneous VOD services are desired. Instead of playing back the time-fill program, a header of a movie title can be played back first, during which the remaining segments, if not locally available, can be fetched from other designated boxes.

Figure 5A:
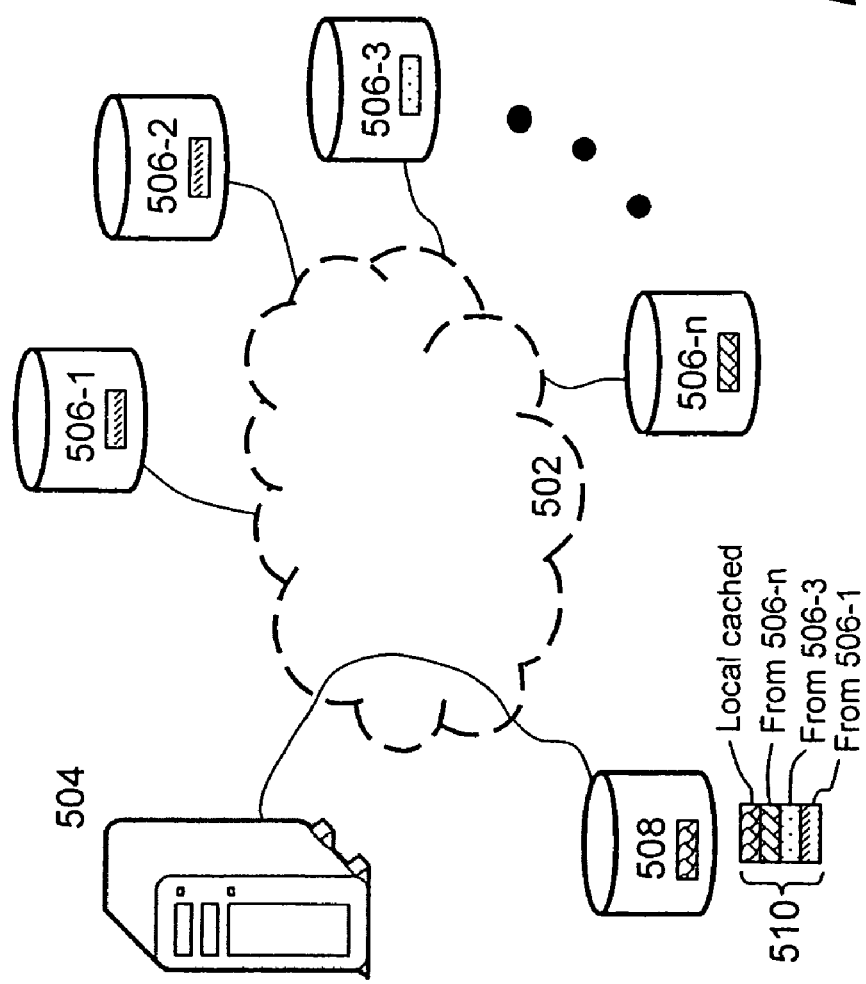
FIG. 5A shows an exemplary configuration in which the present invention may be practiced.
Figure 5B:
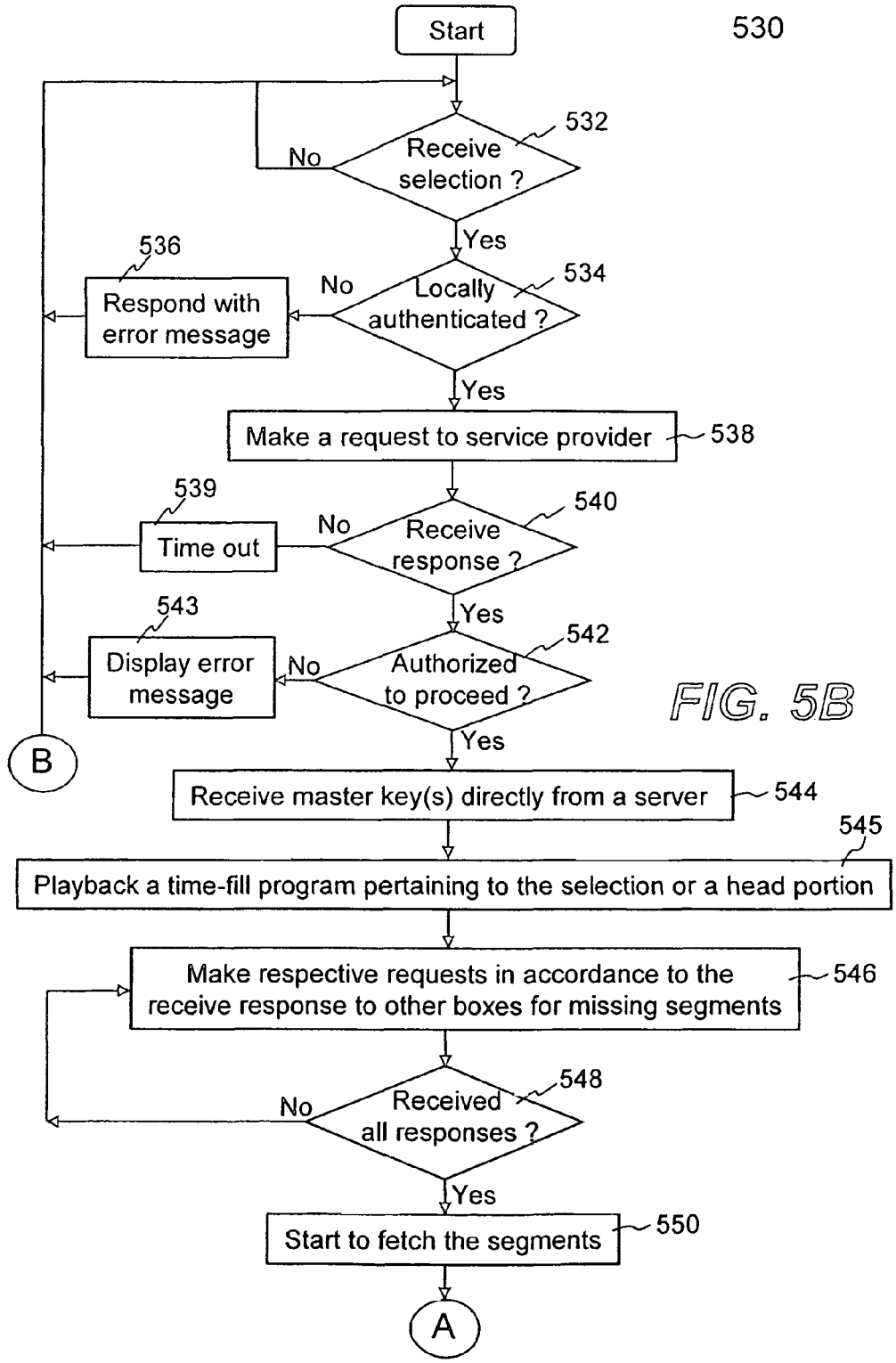
FIG. 5B and FIG. 5C show collectively a flowchart or process of facilitating a playback of an ordered title with access control according to one embodiment of the present invention.
Figure 5C:
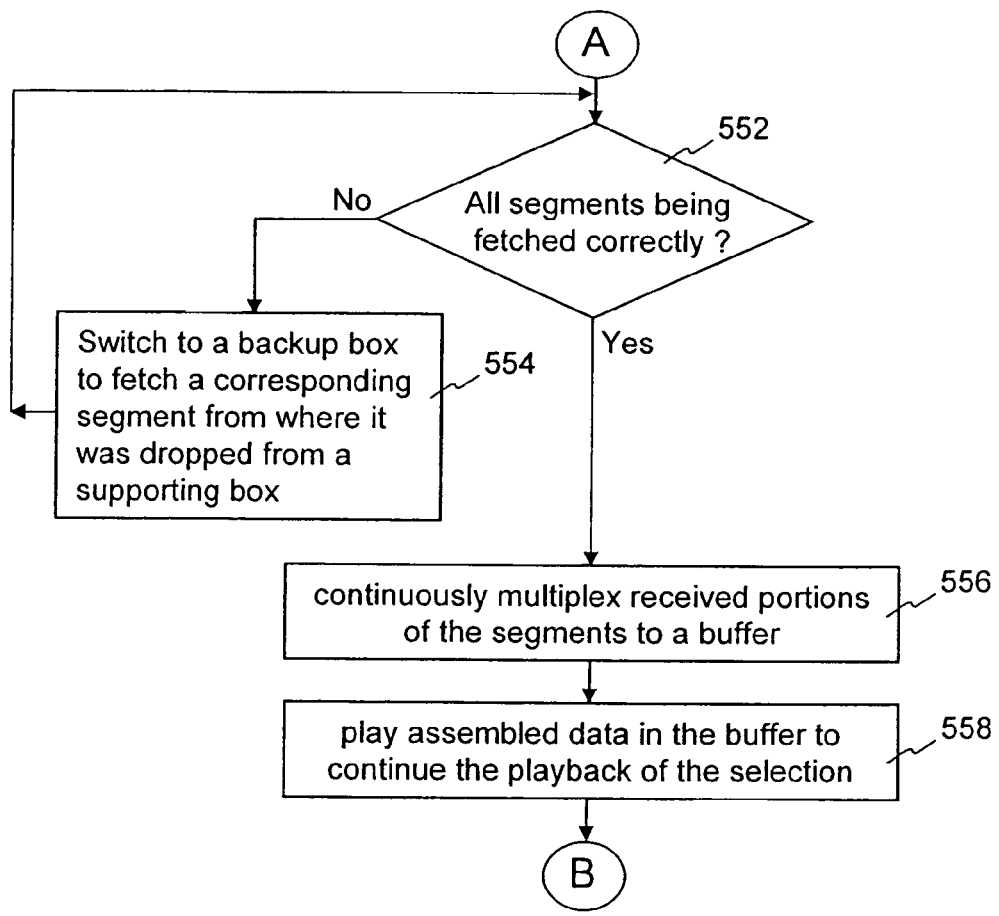

Referring now to FIG. 5A, there shows an exemplary configuration in which the present invention may be practiced. Coupled to the network 502, there are a server 504 and a plurality of local machines or boxes 506-1, 506-2, 506-3, . . . 506-n and 508. The server 504 may correspond to the server 502 of FIG. 2A. Each of the boxes 506-1, 506-2, 506-3, . . . 506-n and 508 includes or is connected to a display screen (not shown). In one embodiment, each of the boxes 506-1, 506-2, 506-3, . . . 506-n and 508 may correspond to a computing device, a set-top box, or a television. Each of the boxes 506-1, 506-2, 506-3, . . . 506-n and 508 may access compressed data representing one or more movies that may be locally or remotely provided. [0010] According to one embodiment, any of the boxes 506-1, 506-2, 506-3, ... 506-n and 508 may receive compressed data from the server 504 that centrally stores all video data and delivers required video data pertaining to an ordered title upon receiving a request. According to another embodiment, the server 504 is configured to identify one or more other boxes to supply pieces of compressed data to a box requesting the data. In other words, all video data is distributed among all boxes in service and the server 504 is not required to deliver all the data in response to a request, and instead is configured to provide source information as to where and how to retrieve some or all of the data from other boxes. As shown in FIG. 5A, a set of compressed video 510 for a movie includes four segments, one being locally available, and the other three segments are respectively fetched from the boxes 506-1, 506-3 and 506-n. The operation of accessing these distributed segments is described in a flowchart or process 530 shown in FIG. 5B.

The process 530 may be readily understood in conjunction with FIG. 5A. However, the process 530 may be independently implemented in software, hardware or a combination of both as a method, a process, or a system. Preferably, the process 530 is executed in a computing device that may correspond to a box as used herein.

At 532, the process 530 awaits a selection from a user. In one case, a user views a display with a plurality of titles from which the user may activate a key (e.g., a displayed or physical key or button) (e.g., on a remote control or keyboard) to choose one of the titles. The process 530 is activated when a selection is made by the user. The process 530 goes to 534 to determine whether the user and/or box is properly authenticated. In one embodiment, a registered user is required to input a username and a password for authentication. In another embodiment, a registered user is required to enter a code for authentication. There may be other ways to authenticate a user. In any case, the process 530 needs to ensure that a user and a box are legitimate. If not, the user is sent an error message at 536 that may recommend that the user register with the system.

After a registered user has been authenticated at 534, the box sends a request at 538 in accordance with the selection. The request includes information about the order and the user. The request is transported over a network to the server by a service provider. Upon receiving the request, the server proceeds with authenticating the user. Depending on a service provider or implementation, the authenticating process may include verification of the user with an account database (e.g., balance checking). Meanwhile, the box awaits a response from the server at 540. The request may be re-sent if a response is not received within a predefined time (e.g., 5 seconds). However, if the response is not received beyond a certain time (e.g., the network is down), an error message will be displayed at 539.

At 542, a response is received from the server. For an appropriate reason, the response may restrict the user from using the system. If the user is restricted, the process 530 goes to 543 to display an error message to the user. It is assumed that the user has been authenticated, the process 530 goes to 544 where one or more "master keys" are received directly from the server. It should be noted that there is a subtle difference in comparing to a prior art system. For example, in a prior art conditional access system, an entitlement control message generator is used to generate entitlement control messages containing a control word (or a master key) and an entitlement identification. The entitlement control messages are broadcasted and received by all receivers. If the entitlement identification in the entitlement control message matches the entitlement of an ordered receiver, the entitlement control messages are decrypted. The control word is then supplied to a descrambler in the receiver.

In contrast, the server in the present invention does not need to broadcast messages containing a master key. Instead, the server needs only to communicate with the ordering box. A master key may be delivered in many ways. For example, an entitlement control message can be sent directly to the ordering box at 544. Alternatively, a secure session may be established between the server and the ordering box, such all secured information including the master key may be transported. Further different from the prior art systems, no keys need to be permanently stored in an ordering boxes according to one embodiment of the present invention. A key needed to decrypt an entitlement control message may be transported in a secure session established between the server and the ordering box.

Besides some of the benefits, features and advantages of transporting keys by server-to-box direct communication, one aspect of the present invention may also be used in applications of repeated access to an ordered title to ensure that the digital content is always secured. Even if a box containing a complete copy of a movie is hacked, the movie can not be accessed without authorization (e.g., a key) from the server. For example, a user may purchase a particular movie title with a "perpetual license." A license may time out sometime after the user first orders the movie. When the user wants to access to the movie again, the box communicates with the server for no-charge authorization to watch the movie.

It is assumed that an ordering box is now equipped with a master key to be used to descramble the scrambled video data being streamed in or the segments being collected locally and/or from other designated boxes. At 745, the locally available header of the ordered title is played back to provide an instantaneous VOD service or a time-fill program is played. One of the purposes of the time-fill program is to provide a time in which sufficient data from the distributed segments can be received to start a smooth playback of the ordered title. In one embodiment, a time-fill program includes one or more trailers or previews pertaining to an ordered title. For example, if the ordered title is "G" rated movie, the time-fill program is compiled to include trailers or previews suitable for general audience. In another embodiment, the time-fill program includes commercial or promotion information (e.g., products or services). In still another embodiment, the time-fill program is configured locally adaptive to a number of factors including reliable playback of an ordered title in view of any particularities/characteristics of the ordering box, particularities/characteristics of the title being ordered (e.g., the rate at which the title is encoded, how many high bit-rate action scenes are present at the beginning of the title, the minimum data to be fetched to guarantee smooth playback of the title and a minimum buffer size of unplayed data), the network connection and history of reliability (e.g., past, recent or particular time of day, etc.), and perhaps even user configuration of the box. In any case, a time-fill program (e.g., a trailer) is preferably complete before the playback of the ordered title starts.

In operation, there are many ways to determine the exact items or content in a time-fill program. In one embodiment, the content in a time-fill program is closely related to what is ordered. For example, a number of R-rated trailers may be assembled in a time-fill program when an R-rated movie is ordered, a number of related trailers by a director or main characters may be assembled in a time-fill program when a movie by the director or the main characters is ordered.

At 546, in accordance with the response from the server, the box makes respective requests to other boxes for the missing segments of the ordered title. As described above, the response includes source information indicating where the box can fetch the missing segments. For example, if there are four segments for a file and the box stores two of the segments locally, then two segments must be fetched from other boxes. At 548, the box awaits a response from the boxes being requested to supply the missing segments. If one of the boxes is unable to respond to the request, a backup box may be called upon to supply the segment. If the backup box is also unable to respond to the request, the box will send a request to the server for additional backup boxes. In any case, after the designated boxes respond to the requests from the ordering box, the ordering box at 550 starts to fetch the missing segments from the designated and responded boxes.

As described above, the missing segments are expected to arrive at a predetermined speed. If, for some reason, a portion of the network is congested or the box itself is malfunctioning, causing a significant slowdown of the segment being fetched, the process 530 goes to 554 where a backup box is called in to continue supplying the segment being interrupted.

If all segments are streaming at predetermined minimum speeds, then, at 556, portions of the segments locally stored and the portions of the segments being streamed in are multiplexed into a buffer as shown in FIG. 4A. As soon as the leading portion of the data (either the time-fill program or the header) is finished, the multiplexed data in the buffer is now played back to continue the ordered title.

Figure 6:
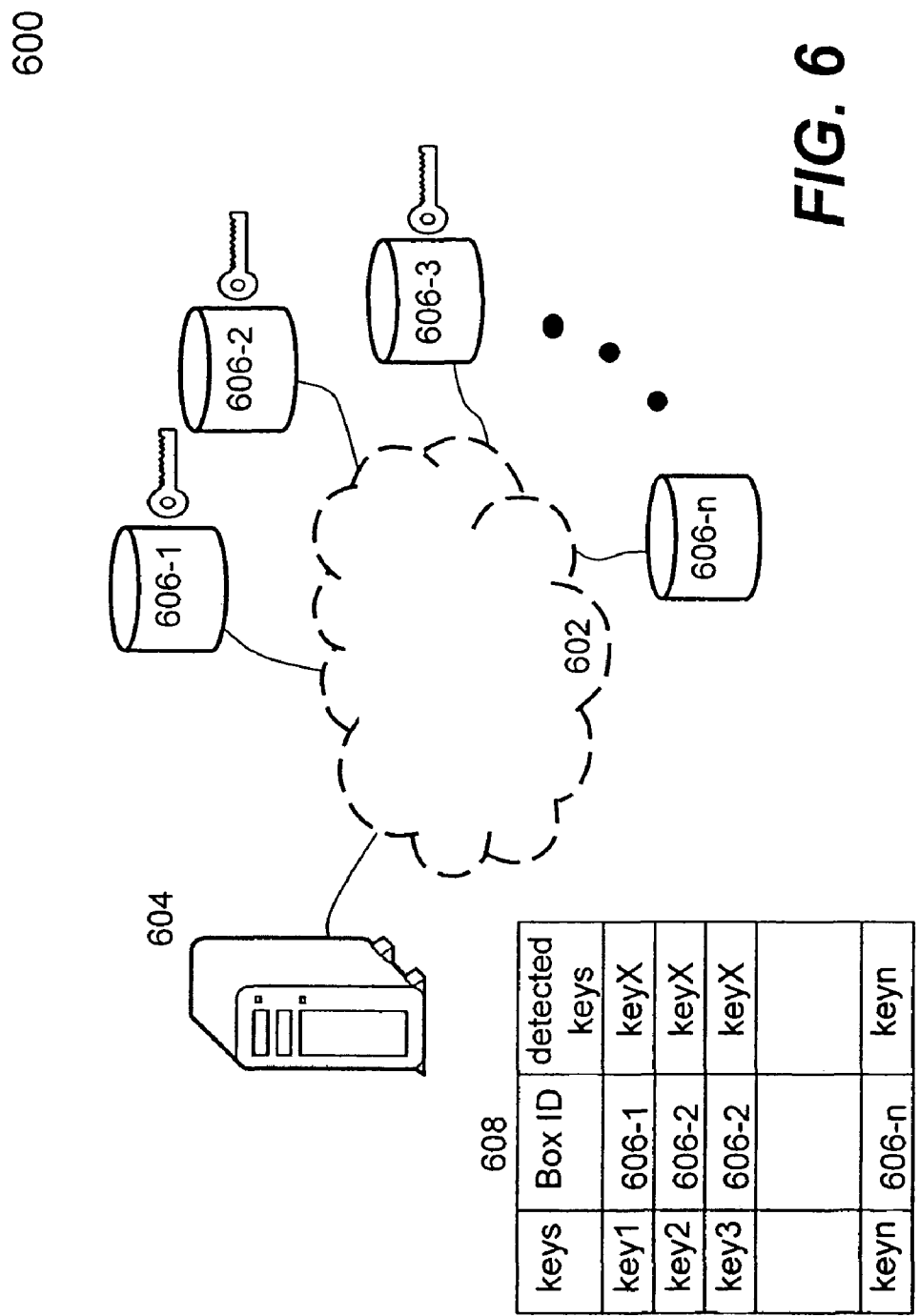
FIG. 6 provides an illustration in which three boxes among a plurality of boxes in service are assumed to have been hacked.

Besides the distinct access control features provided by the architecture shown in FIG. 3A, according to one embodiment, the architecture provides the ability to disable a specific device that is known to have been hacked, or to update a device to be stopped from being hacked or for other reasons. FIG. 6 shows an illustration 600 in which three boxes 606-1, 666-2 and 606-3 among a plurality of boxes in server are assumed to have been hacked. One exemplary hacking scheme is that an embedded key (e.g., within a smart card) is illegitimately obtained and duplicated. It is assumed that boxes 606-1, 606-2 and 606-3 are now loaded with a valid but duplicated key. In the prior art system, since entitlement control messages are broadcasted, as long as a recipient has a valid key, encrypted contents can be decrypted. In contrast, the architecture shown in FIG. 3A provides a mechanism over direct box-to-server communication to revoke services to a box known to have been hacked or update the box for a new key.

According to one embodiment, when the box 606-2 is placed with an order for a movie title, the box 606-2 proceeds with a request to a server 604. The server 604 is configured to verify a signature of the key originally assigned or generated for the box 606-2. If it is found that the signature is no longer matched with an internal database, the box 606-2 is declared to have been hacked. The requested service request from the box 606-2 is thus declined. An exemplary illustration 608 of the internal database is shown in FIG. 6 where it shows that all three boxes 606-1, 606-2, and 606-3 (as box ID) are now labeled as "hacked" because their respective keys or signatures thereof listed in the right column no longer match what they were assigned to listed in the left column. As an example, all three keys for the boxes 606-1, 606-2, and 606-3 are cloned (shown as being all identical). For completeness, the box 606-n is shown as a legitimate recipient because its key is intact, namely the detected key is the same as the originally assigned key. Depending on implementation, the (decryption) key or keys may be made only valid for respective segments and periodically updated.

According to one embodiment, upon receiving a request from a hacked box, the server 606 is configured to insist that the box be upgraded to or updated with a latest version of client software/key(s) or perform any other procedures before the box can be serviced again device.

According to one aspect of the present invention, the architecture of FIG. 3A provides content revocability/updatability by virtue of the fact that content is stored in electronic form. When it is desired to revoke a particular piece of content, the server 302 may send appropriate messages to all the boxes to cause them to delete that particular piece of content. Optionally, the relevant boxes may be caused to replace that particular piece of content by a new version.

According to another aspect of the present invention, the architecture of FIG. 3A also provides portability of media services. As described above, data pertaining to a video title is distributed among boxes in service. Unlike in the prior art system in which a box associated with a user has been loaded with a large quantity of data (e.g., ordered movies) personal to the user, the boxes in accordance with the present invention are primarily loaded with distributed segments of data, even with ordered or purchased movies. A user may get on any one of the boxes to access his/her personalized services.

According to one embodiment, a portable device is provided. The portable device may be a type of miniature hardware device (e.g., a smart card, a sim card, a USB key etc.). The portable device is loaded with parameters that include authentication information about the user. If the user has a list of personal library with purchased movies, some of the parameters may reflect the list or titles. When the user connects the portable device to another box (e.g., inserting a smartcard into the box), with the parameters loaded from the portable device to the box, the user can access the media services no different from the box he/she has been using, perhaps, at his/her residence.

According to one embodiment, the parameters include a unique ID that cannot be duplicated. When the smartcard is plugged into a box, a cryptographic protocol is executed between the server and the smart card to do mutual authentication. This cryptographic protocol is typically based on public-key encryption (e.g., Diffie-Hellman). Once the server has authenticated the smart card, a software module in the set-top box is informed about the identity of the user and is provided with information necessary to personalize the user interface.

To ensure that the smart card is indeed plugged into a "correct" set-top box, additional security checks may be provided. For example, a software-based attack may make the server think that the smart card is locally attached to one box when it is actually attached to a different box. (e.g., a user A may plug his smart-card into a hacked box in California, and let his contact in New York use his own hacked box to watch A's movies by pretending that A's smart card is plugged into the New York box). In one embodiment, the additional security checks include a timing check, where the smart card uses a protocol to communicate with the software module in the box and verifies that the software module responds with highest priority.

One of the portability features, advantages and benefits as described above is that a user is associated only with a corresponding smart card. For example, the user may plug his smart card into any box and purchase a movie. The purchased movie will be associated with the user, not with that box. So once the movie is purchased, the movie may be accessed from virtually any of the boxes in service. According to one embodiment, a protocol based on CPRM (Content Protection for Recordable Media) specification is used for authenticating CPRM-compatible devices.

As described above, the architecture of FIG. 3A provides a mechanism to establish a secure communication session with a box. In a different embodiment that does not use a portable device, a user is provided with a set of confidential information that once is provided to a box, pertinent data (e.g., personalized user interface or previously purchased movies can be made available) is loaded into the box. In operation, when a user enters predefined confidential information into a box that transports the information to a server. The server is configured to verify the received information. Upon authenticating the user, the server uploads parameters/data to the box the user is using. Upon receiving the parameters/data, the box is perhaps reconfigured and becomes customized for the user.

Video playing devices, such as TVs, VCRs, DVDs, Personal Video Recorders ("PVR") and similar devices, include trickplay features such as video in pause, fast forward, reverse, slow motion, and etc. When a video is in the pause trickplay mode, a still frame is displayed while the audio is usually stopped as well. A slow motion trickplay mode displays the video forward at one-half the normal play speed or other speeds between 0 and normal play speed. The normal play speed is usually the real-time playback speed. The audio may be muted during the slow motion trickplay mode. In a fast forward trickplay mode, the video is displayed at rates faster than the normal play speed, usually three times or faster. In a reverse trickplay mode, the video is displayed in reverse.

In general, a compressed video bitstream includes three types of pictures: intra pictures ("I" pictures); predicted pictures ("P" pictures); and bidirectionally predicted pictures ("B" pictures). The I pictures are coded using only information present in the picture itself. The P pictures are coded with respect to the nearest previous I or P pictures. Like I pictures, the P pictures also can serve as a prediction reference for B pictures and future P pictures. The B pictures are pictures that use both a past and future picture as a reference. In MPEG2 video streams, B pictures cannot reference other B pictures. However, in AVC video streams, B pictures can reference other B pictures.

For video bitstreams in MPEG2, the structure of sequence of pictures and types of pictures in MPEG2 video streams allow certain pictures to be skipped from being decoded and displayed. Typically, different speeds of fast forward may be accomplished by simply skipping some of the pictures from being decoded and displayed.

Figure 7A:
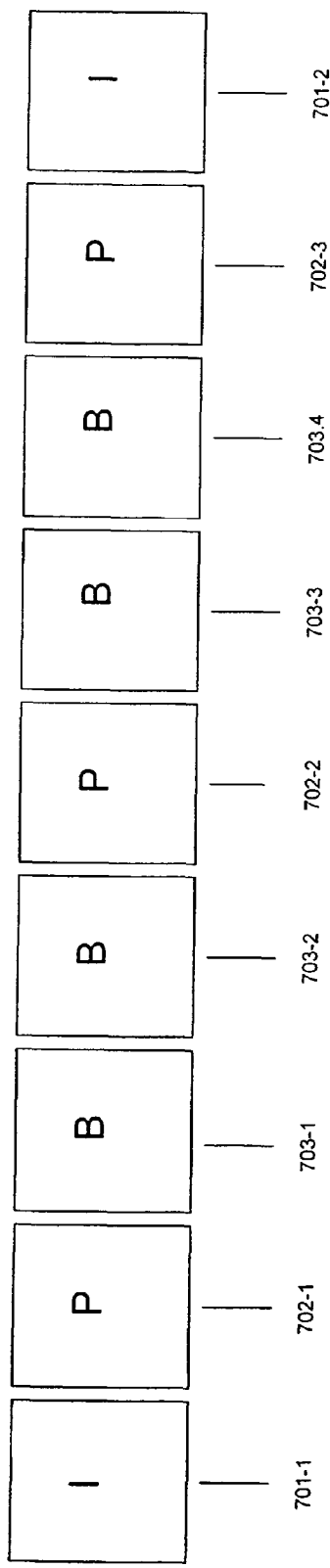
FIG. 7A provides an illustration of a group of pictures according to the MPEG2 standard.

Referring to FIG. 7, in MPEG2 video streams, B pictures 703 cannot reference other B pictures 703. Additionally, I pictures 701 are usually less than a second apart. The structure of the sequence of pictures in MPEG2 710 is usually IBBPB-PBBPBBP in display order. Accordingly, for MPEG2 videos, the first speedup can be obtained by simply skipping B pictures 703 that are not referenced by other pictures from the decoder. This usually gives an approximate speedup of 3× since there are approximately 2 B pictures out of every three pictures. Since B pictures 703 are not referenced by any other pictures, they can be skipped and the decoder can still decode other pictures completely. Other speeds can be implemented by skipping B and P pictures 702 and 703 and jumping to consecutive I pictures 701. Finally, the number of pictures displayed per second can be controlled to display less than 24 or 30 pictures per second to provide a perception of higher trickplay speed. In a reverse playback mode, pictures are decoded from I picture 701 forward, but displayed in reverse.

Figure 7B:
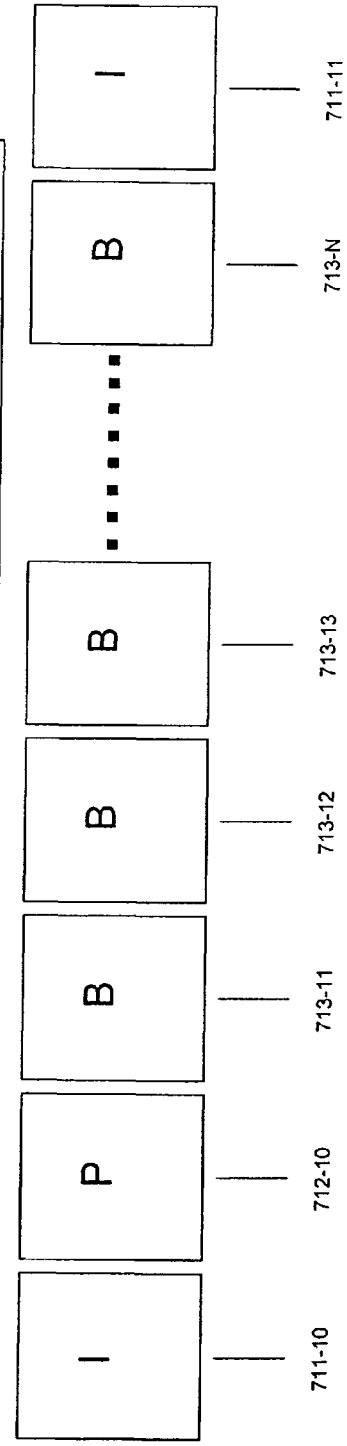
FIG. 7B provides an illustration of a group of pictures according to the AVC standard.

The trickplay mechanism used for MPEG2 video streams cannot be used for low bitrate Advanced Video Coding ("AVC") streams. Referring to FIG. 7B, unlike MPEG2, AVC allows B pictures 713 to be referenced by other B pictures 713. This allows better bitrate and encoding quality. Accordingly, constraining AVC encoder to making B pictures 713 unreferenced in the resulting encoded bitstream could affect the video bitrate and encoding quality.

Additionally, in AVC video streams, the I pictures 711 may be spread far apart, in the order of five seconds or more. Accordingly, closer jumps within the stream between I pictures 711 in less than five seconds at a time may not be possible. This is not the case in broadcast systems, PVRs and DVDs, where I pictures are constrained to about a second or less due to other desired features like fast channel change, etc. Constraining I pictures to a rate of one per second or more would also affect the video bitrate and ultimately video quality.

Figure 8:
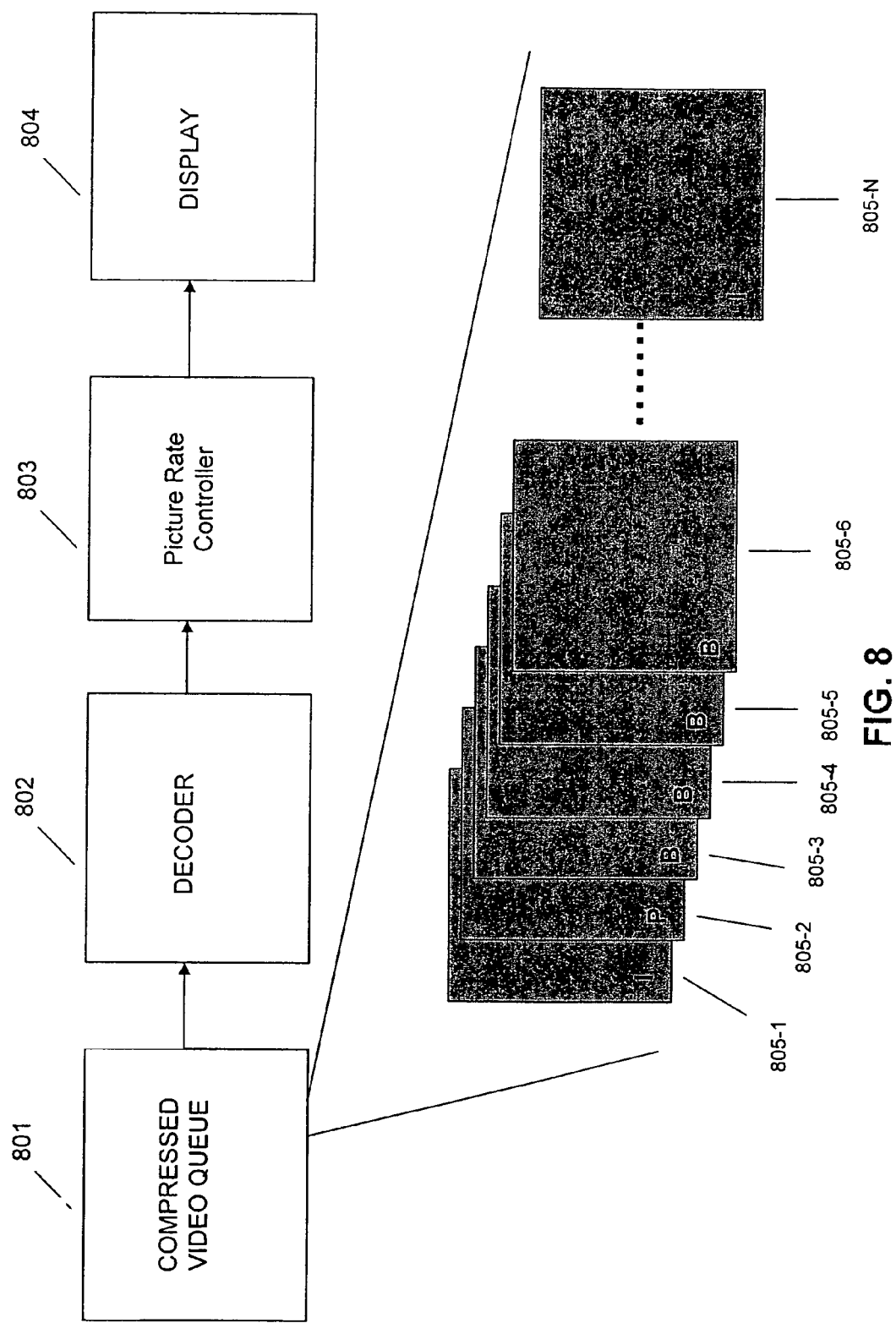
FIG. 8 shows an embodiment of a trickplay system for highly compressed video data.

Referring to FIG. 8, one embodiment of the present invention includes a decoder 802, a picture rate controller 803, and a display 804. A compressed video stream 805, such as an AVC video stream, is fed to the decoder 802. The decoder 802 may include an AVC decoding chip supporting 4× standard-definition decoding, and 2× high-definition decoding, which allows the decoder 802 to decode the pictures at two to four times faster than the normal playback speed.

Once a complete picture is decoded, it is sent for display through the picture rate controller 803. Depending on whether it is visually acceptable to users, the picture rate controller 803 determines the number of decoded pictures to be displayed. For example, the picture rate controller may display 8, 12 or 15 pictures per second, rather than 24 or 30. The number of pictures per second is determined by the trickplay module in the application software to give a perception of video displaying in the selected trickplay mode. The display rate also depends on what is visually acceptable to users. For example, if a picture is displayed for too long between jumps in a fast forward trickplay mode, then users may focus on the picture for too long and may cause dizziness when the jumps between pictures happen. Similarly, if pictures move too fast, e.g. At 30 pictures per second while skipping some picture, the amount of information can overwhelm the viewer and cause fatigue or otherwise unpleasant experience.

Figure 9:
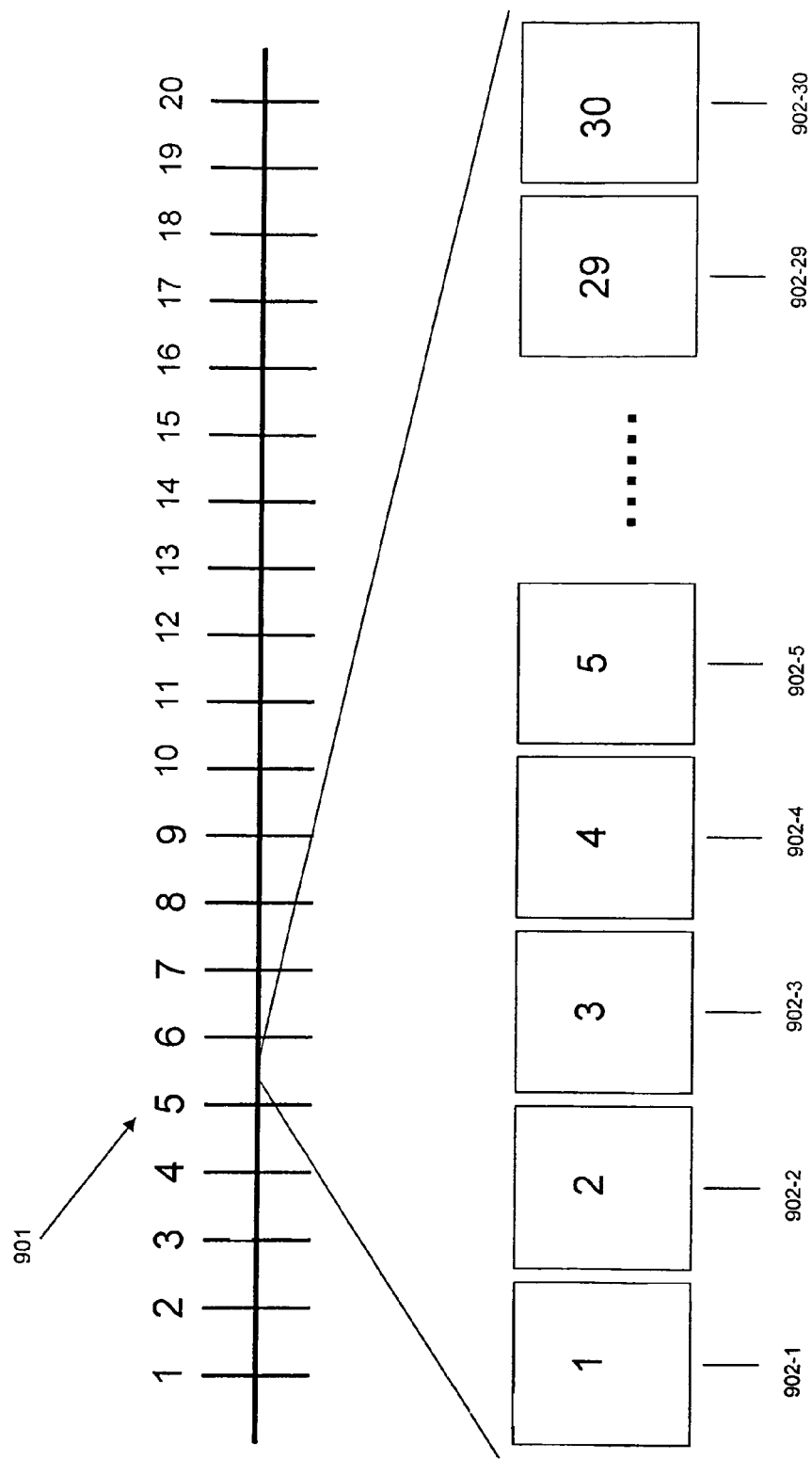
FIG. 9 is an illustration of decoded pictures for one second of video stream.

Referring to FIG. 9, a video stream timeline 901 represents about 20 seconds of video. In a second, there may be 15 to 30 pictures 902. When there are 30 pictures 902, as shown in FIG. 9, and the trickplay controller 803 is programmed to display 15 pictures per second, then every other picture is displayed 902-1, 902-3, 902-5, 902-7 so forth until 902-29. The other pictures are not shown during the playback in trickplay mode. This mode effectively results in 2× real-time fast forward trickplay.

For higher speed trickplay modes, the decoder 802 may jump to an I picture 711-10 or 711-11, decode and display that I picture. The AVC decoding chips allow a number of pictures following the selected I picture to be decoded at two to four times faster than the normal playback speed. Once the decoder has decoded the selected I picture and the following pictures, the trickplay controller will determine which and how many pictures to display. The trickplay controller also determines the duration of playback before a jump to a subsequent part of the video bitstream, the decoding speed required, the number of pictures to display per second, and the distance between jumps of video scenes. These factors depend on the particular trickplay mode-fast forward, reverse, slow motion, and others. In one embodiment, a trickplay system 800 may reside on a Linux/X86 prototype system.

As an illustration, the following table illustrates how a set of trickplay modes maps onto the settings:

| SPEED | PLAYBACK BEFORE JUMP | DECODE SPEED | DISPLAY RATE | JUMP LENGTH |
|---|---|---|---|---|
| 100x reverse | 0.2 sec | 2x | 5 fps | 20 sec |
| 50x reverse | 0.2 sec | 2x | 7 fps | 10 sec |
| 10x reverse | 0.5 sec | 2x | 10 fps | 5 sec |
| 2x forward | n/a | 2x | 30 fps | no jumps |
| 5x forward | 1 sec | 2x | 15 fps | 5 sec |
| 10x forward | 0.5 sec | 2x | 10 fps | 5 sec |
| 50x forward | 0.2 sec | 2x | 7 fps | 10 sec |
| 100x forward | 0.2 sec | 2x | 5 fps | 20 sec |

Referring to the chart above, assuming that a compressed video bitstream includes 30 pictures per second, when a user selects to fast forward five times the normal play speed, the decoder decodes two seconds of video or about 60 pictures. The trickplay controller then determines that about 15 pictures from the 60 uncompressed pictures should be displayed in a second or at 15 frames per second. The decoder then jumps to the part of the video bitstream that is five seconds after the pictures that were previously decoded and displayed. The decoder decodes another two seconds segment of the video stream. The trickplay selects and displays 15 pictures from the 60 uncompressed pictures to be displayed in a second. This is continued until the user returns to watch video in real-time speed. The trickplay engine does not have to decode all 60 pictures before displaying any of the decoded pictures. The machine may keep decoding the pictures one after another, for example at 2x real-time speed, and then keeps dropping three out of every four decoded pictures as it shows only 15 pictures per second. These parameters may be selected by the application/trickplay controller module.

In another embodiment, there may be no jumps within the video bitstream where the decoding speed is sufficiently fast for a trickplay mode. For example, when the video is displayed two times faster than the normal play speed, then there is no jump within the video bitstream. The first two seconds of pictures are decoded by the decoder. From the 60 uncompressed pictures—in a case where there are 30 pictures per second—30 pictures are selected and displayed by the trickplay controller. Thus, two seconds of video is shown in one second or two times faster than the normal speed. While the trickplay controller and the display are displaying the pictures, the decoder decodes the following two seconds of the video bitstream. Again, the trickplay controller and the display select and show 30 pictures per second from the 60 uncompressed pictures from the decoder. Thus, no jumps are made within the bitstream. Similarly, in other settings depending on the decoding speed and trickplay mode, there may be no jumps within the bitstream. This process happens in a pipelined fashion where pictures are decoded as they arrive to the decoder, and that or another picture (since decoding and displaying order may differ) is passed on down the pipeline for display. Any picture may be dropped by the picture rate controller depending on the number of pictures per second shown.

The foregoing description of embodiments is illustrative of various aspects/embodiments of the present invention. Various modifications to the present invention can be made to the preferred embodiments by those skilled in the art without departing from the true spirit and scope of the invention as defined by the appended claims. Accordingly, the scope of the present invention is defined by the appended claims rather than the foregoing description of embodiments.

We claim:

1. A method of displaying a video bitstream comprising the steps of:
receiving a compressed video bitstream wherein the video bitstream includes a plurality of frames;
decoding the plurality of frames to provide uncompressed frames;
selecting a trickplay video display mode;
selecting a first sequence of uncompressed frames to be displayed prior to displaying a second sequence of uncompressed frames depending on the trickplay video display mode, wherein an interval between a last frame of the first sequence and a first frame of the second sequence is greater than an interval between any two consecutive frames in the first sequence; and
displaying the selected sequence of uncompressed frames in the trickplay video display mode.

2. The method of claim 1, wherein the step of selecting a first sequence of uncompressed frames further comprises the step of determining a rate of frames to be displayed.

3. The method of claim 2, wherein the rate of frames to be displayed depends on the trickplay mode.

4. The method of claim 1, wherein the step of selecting a first sequence of uncompressed frames further comprises the steps of determining a duration of play before jumping to the second sequence of uncompressed frames; and determining a length between jumps within the video bitstream.

5. The method of claim 4, wherein the duration of play and the length between jumps depend on the trickplay mode.

6. The method of claim 4, wherein the length between jumps is between about one to about thirty seconds.

7. The method of claim 1, wherein the video bitstream is in Advanced Video Coding or H.264 or MPEG4 Part 10 compressed video format.

8. The method of claim 1 further comprising jumping to the subsequent set of frames.

9. The method of claim 1, wherein the plurality of frames is decoded two to four times a normal play time.

10. The method of claim 1, wherein the group of frames includes intra frames, predicted frames, and bidirectionally predicted frames.

11. The method of claim 1, wherein the trickplay mode comprises displaying the uncompressed frames of the video bitstream at a rate accelerated above the normal play rate.

12. The method of claim 1, wherein the trickplay mode comprises displaying the frames of the video stream so that the video appears to be in reverse.

13. The method of claim 12, further comprising jumping to a previous frame and displaying subsequent frames.

14. A system of displaying a video bitstream, comprising:
a decoder to receive compressed frames and to decode the compressed frames;
a trickplay controller connected to the decoder to select a first sequence of decoded frames to be displayed prior to displaying a second sequence of decoded frames depending on a trickplay mode, wherein an interval between a last frame of the first sequence and a first frame of the second sequence is greater than an interval between any two consecutive frames in the first sequence; and
a display connected to the trickplay controller to display the selected sequence of decoded frames in the trickplay mode.

15. The system of claim 14, the trickplay controller determines a rate of frames to be displayed.

16. The system of claim 15, wherein the rate of frames to be displayed depends on the trickplay mode.

17. The system of claim 14, wherein the trickplay controller determines (i) a duration of play before jumping to the second sequence of decoded frames, and (ii) a length between jumps within the video bitstream.

18. The system of claim 17, wherein the duration of play and the length between jumps depend on the trickplay mode.

19. The system of claim 17, wherein the length between jumps depends on spacing between intra frames.

20. The system of claim 17, wherein the length between jumps is between about one to about thirty seconds.

* * * * *